(No Model.)
J. HICKLING & T. SLATER.
MOLD FOR BOTTLE STOPPERS.
No. 576,966. Patented Feb. 9, 1897.
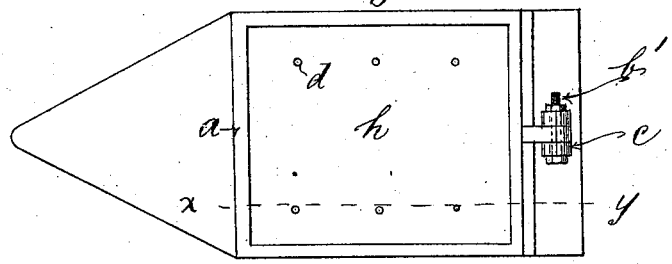
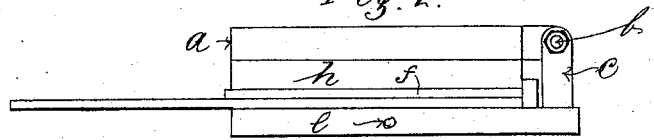
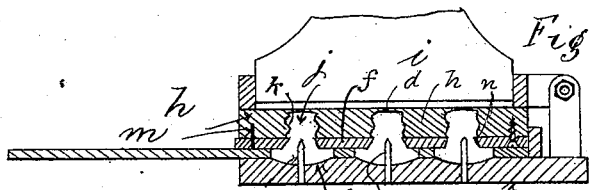
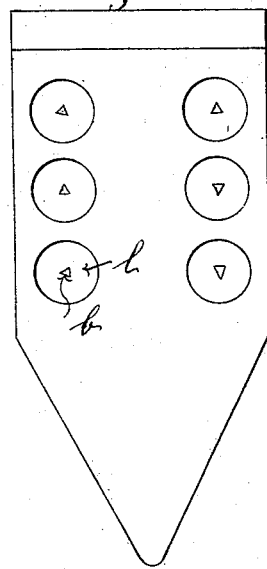
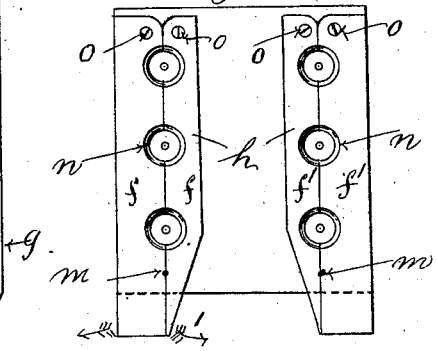
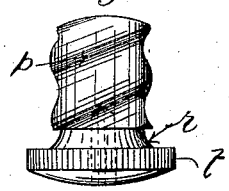
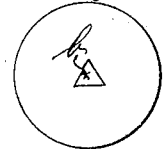
Witnesses
Horace Gillies
James Fleming
Inventors
James Hickling
Thomas Slater
per E. Eaton
His Attorney

UNITED STATES PATENT OFFICE.

JAMES HICKLING AND THOMAS SLATER, OF LONDON, ENGLAND.

MOLD FOR BOTTLE-STOPPERS.

SPECIFICATION forming part of Letters Patent No. 576,966, dated February 9, 1897.

Application filed August 3, 1896. Serial No. 601,504. (No model.)

*To all whom it may concern:*

Be it known that we, JAMES HICKLING and THOMAS SLATER, subjects of the Queen of Great Britain, and residents of London, England, have invented certain new and useful Improvements in Molds for Bottle-Stoppers, of which the following is a full, clear, and exact specification thereof.

This invention relates to a new or improved mold for casting stoppers for bottles and the like; and it consists in so constructing and arranging the mold that the screw and head of the stopper are cast without a seam, and the same is carried out as follows.

Referring to the annexed drawings, Figure 1 is a plan view of a mold constructed according to our invention; Fig. 2, a side elevation of same; Fig. 3, a section through line $x\,y$ in Fig. 1; Fig. 4, a plan view of part of mold in which the heads are cast; Fig. 5, a plan view of the under side of the part of the mold in which the screwed portion of the stopper is formed; Fig. 6, a side elevation of stopper to enlarged scale; Fig. 7, a plan view of top of same.

Referring to Figs. 1 to 5, $a$ is a hinged or pivoted frame carried, as shown, in the bearing $c$ by means of the pivot-pin $b'$. $h$ is the part of the mold in which the screw-threaded portion of the stopper is cast in the cavity or matrix $j$. The part $r$ or groove on the stopper, Fig. 6, and which carries the usual washer, is formed at the part $n$ between the movable pieces $ff$ and $f'f'$. The shape of the groove at $r$, Fig. 6, is of course dependent upon the shape of the aperture at $n$, so that a half of said aperture is formed in the parts $ff$ and $f'f'$, that is, one-half in each part. $m$ is a pin for insuring the correct position of the parts $ff$ and $f'f'$ when together, as shown in Fig. 5. The parts $ff$ and $f'f'$ are pivoted at $o$ to the part $h$, so that they may be separated, as shown by the arrows 1. The glass or metal is placed in a molten state in the frame $a$, and the piston or plunger $i$ is employed to force the glass or metal through the apertures $d$ in the part $h$, which forms the screw-thread.

$k$ is a core or projection of suitable cross-section, such as triangular, and which forms a recess $b$ in the head of the stopper into which a key may be inserted for facilitating the removal of the stopper from the part $h$ of the mold, or inserting or removing same from a bottle when in use.

The frame $a$ may be turned up upon the pivot $b'$ when required.

The parts $g$ and $h$ being each formed in one piece it will be seen that there will be no seam on the screwed portion $p$ of the stopper or upon the head of same, and which may be milled, as shown at $t$. By removing the part $h$ from the part $g$ the heads of the stoppers are removed from the cavities or matrices $l$ and the parts $ff$ and $f'f'$ are separated, and thus the stopper may be unscrewed from the part $h$.

Having thus described our invention, what we claim, and desire to secure by Letters Patent, is—

In molds for casting stoppers for bottles, two parts or sections formed so as to have seamless cavities or matrices in which the screw and head of the stopper are cast by pressing the glass thereinto, one part or section having the cavities or matrices for forming the screw-thread upon the stopper, the other part or section having the cavities or matrices for forming the head of the stopper said cavities or matrices having cores or projections for forming a recess in the head of the stopper, movable sections or parts pivoted to the sections or parts forming the screw-thread upon the stopper and having apertures which form the matrices for that portion of the stopper which is between the screw-thread and the head, the position of said pivoted sections or parts being regulated by studs or pins, a pivoted or hinged frame which forms a receptacle for the molten glass or metal which is forced through suitable apertures into the cavities or matrices in which the stopper is cast.

In testimony that we claim the foregoing we have hereunto set our hands this 12th day of June, 1896.

JAMES HICKLING.
THOMAS SLATER.

Witnesses:
BENJAMIN CLARK,
H. D. HOSKINS.